Aug. 11, 1953   N. A. HASSLER   2,648,815
ELECTROMECHANICAL AMPLIFIER
Filed July 20, 1951   2 Sheets-Sheet 1

INVENTOR
NORMAN A. HASSLER
BY
ATTORNEY

Patented Aug. 11, 1953

2,648,815

UNITED STATES PATENT OFFICE 2,648,815

ELECTROMECHANICAL AMPLIFIER

Norman A. Hassler, Port Washington, N. Y., assignor to The Sperry Corporation, Great Neck, N. Y., a corporation of Delaware Application July 20, 1951, Serial No. 237,763

18 Claims. (Cl. 323—90)

This invention relates to an electromagnetic device which primarily is adapted to function as an amplifier, modulator, signal mixer and the like, and, more particularly, my invention relates to an amplifier which may function in any one or more of the above manners wherein electromagnetic devices, comprising a fixed alternating magnetic field and a rotor mounted within said field to rotate relative thereto, are connected in cascade fashion as successive stages of the amplifier.

More specifically, each stage of the amplifier of this invention comprises an electromagnetic device comprising a stator providing an alternating magnetic field and a rotor having a winding thereon supported to rotate within said field, the deflection of the rotor being proportional to the amplitude of the signal voltage supplied thereto and the direction of the deflection being dependent upon the phase sense of the signal voltage with respect to the phase reference provided by the exciting current employed in producing the alternating field. In accordance with my invention, these devices may function as modulators in that a unidirectional voltage may be supplied to the rotor winding. In this case, a unidirectional field is provided along with the alternating field. In both cases, the output circuit is characterized by the fact it is tuned substantially to unity power factor to eliminate reaction torque on the rotor; and the output, provided in the output circuit of the device which is connected to the rotor winding, will be dependent upon the extent to which the rotor winding is coupled with the alternating field and this, of course, is dependent upon the angle of deflection of the rotor winding produced by the input signal voltage. Electromagnetic devices of the character employed in the present amplifier are more particularly described and illustrated in my copending application S. N. 234,881, entitled Electro-mechanical Transducer, filed in the U. S. Patent Office on the 2nd day of July, 1951. Briefly, however, these electromagnetic devices may be constructed in the form of, for example, Selsyns and similar instruments, moving coil type meter instruments, and the like.

Electromagnetic transducers or devices of the character above briefly pointed out may also be used as limiters to prevent the output of any one stage or of the entire amplifier from exceeding some predetermined value. This is readily accomplished by providing mechanical stops which may be adjustable to cooperate with a vane or similar cooperating member affixed to and movable with the rotor or moving coil of the device.

It is an object of the present invention to provide an amplifier comprising a plurality of stages each stage including an electromagnetic device of the foregoing character, that is to say, a stator and winding thereon excited from an alternating current source and a rotor and winding thereon rotatably mounted in the field provided by the stator, the signal voltage source being connected with the rotor winding of a first stage of the amplifier and the output circuit which is connected with the rotor winding of said first stage being coupled to provide an input signal to the rotor winding of the second stage of the amplifier, the rotor winding of the second stage being connected with a second output circuit and each of these output circuits including means for tuning each to unity power factor. As more specifically brought out in my aforesaid copending application S. N. 234,881, the output circuit of each stage of the amplifier is tuned substantially to unity power factor so that no reaction torque will be exerted on the rotor and hence considerable power gain may be realized together with linear operation.

A further object resides in providing an amplifier comprising a plurality of stages, each stage comprising an electromagnetic device of the character above pointed out and the stages being connected in cascade fashion, wherein means are provided for preventing the input signal from feeding directly through one stage of the amplifier when, for example, the rotor thereof is in a limit stop position.

Still another object resides in providing an amplifier of the foregoing character wherein signals are mixed and means are provided for adjusting the relative phase of any currents supplied to the output circuit of a stage of the amplifier, other than the signal current output of that stage, so that the vector resultant of these currents in the rotor winding of that stage will produce a flux in quadrature with the field flux, thereby producing no deflection of the rotor of that stage due to such currents. In other words, the output of the amplifier will be an amplified or modified version of the signal input and no error will be introduced because of additional currents in the rotor winding produced by any signals added or which may feed back into the output circuit. Still more specifically, it is an object of this invention to produce this latter result by adjusting the relative phase of the various signals in or supplied to the amplifier with respect to each other and with respect to the phase of the exciting currents employed in producing the alternating fields in the various stages of the devices.

With the foregoing and still other objects in view, my invention includes the novel elements and the combinations and arrangements thereof described below and illustrated in the accompanying drawings, in which—

Fig. 1 schematically represents one form of the electromagnetic device constituting one stage of my amplifier;

Figure 1:
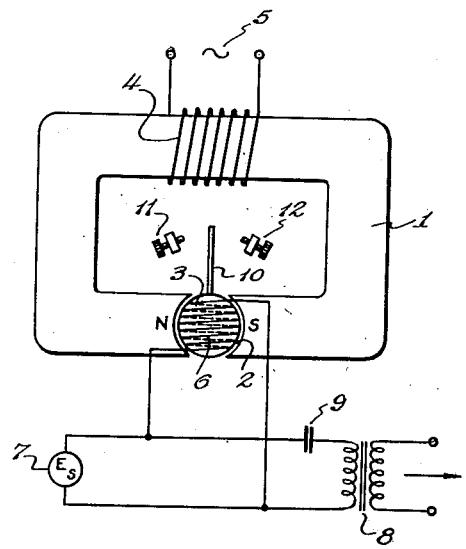
Figure 2:
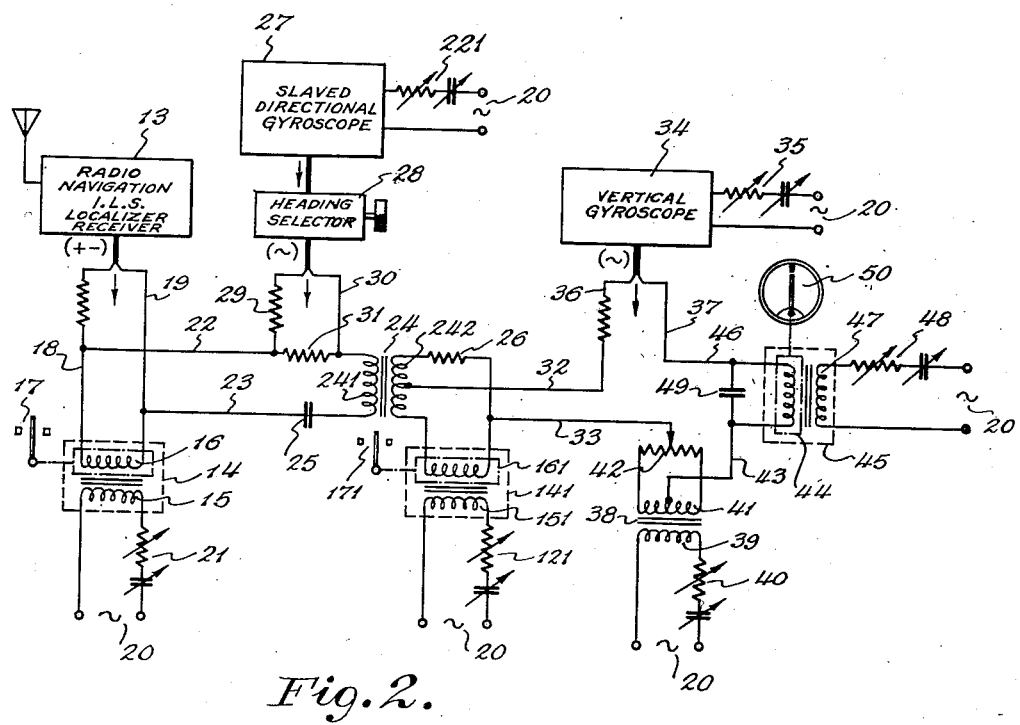
Fig. 2 is a wiring diagram of a preferred form of amplifier.
Figure 3:
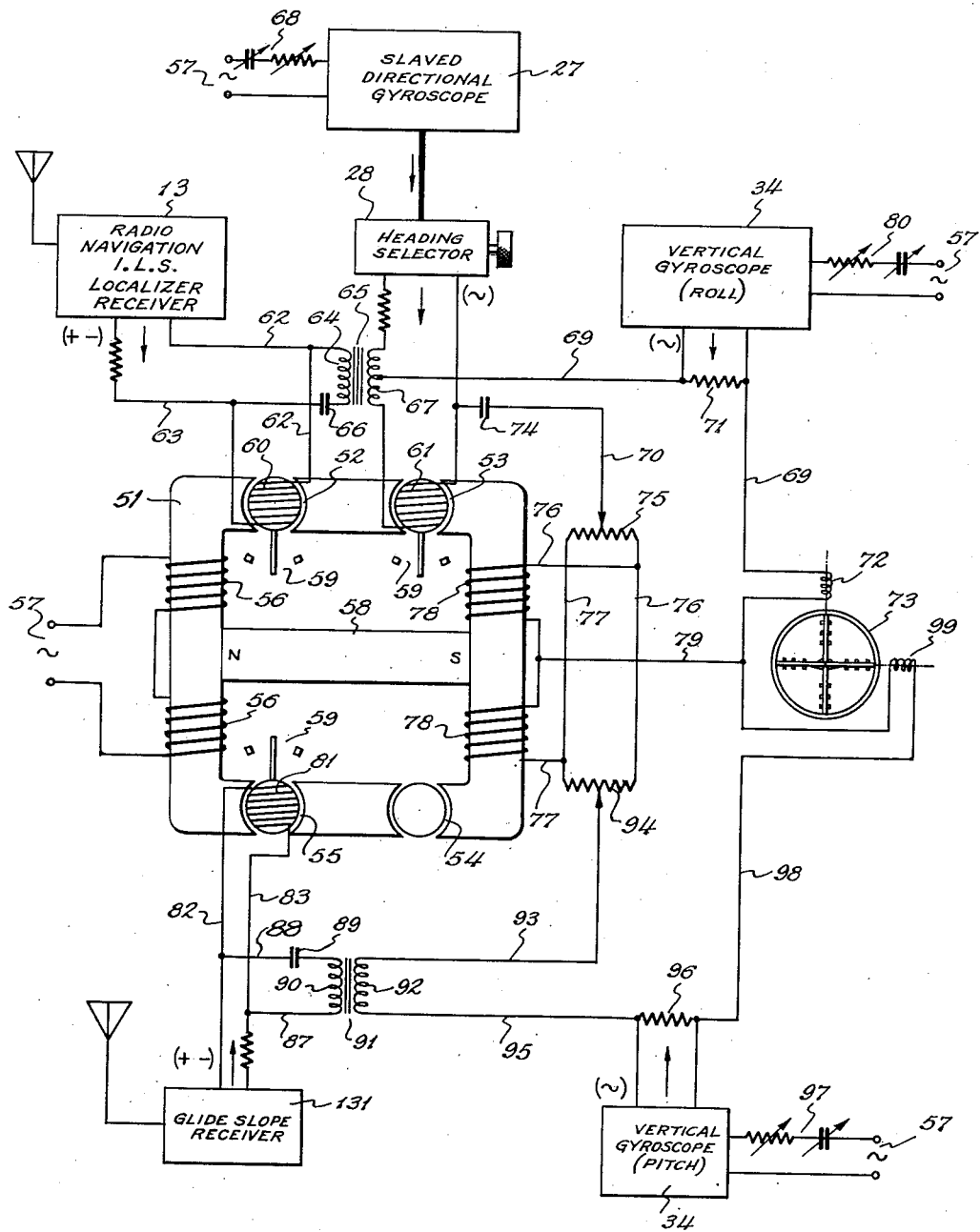
Fig. 3 illustrates a modified form of amplifier.

Referring first to Fig. 1 wherein I have illustrated one embodiment of a single stage of the present amplifier, 1 indicates the core structure which is formed of suitable magnetic material and provided with spaced poles forming an air gap 2 within which the rotor 3 is rotatably mounted. As set forth in my aforesaid copending application S. N. 234,831, the device of Fig. 1 may take the form of a selsyn-like instrument as well as that of the moving coil type meter instrument shown in Fig. 1. An exciting winding 4 is mounted on core 1 and connected with a suitable alternating current supply 5 to provide an alternating magnetic field in air gap 2. If the device is to be used as a modulator, the core may be formed at least in part of permanent magnetic material to provide the north and south poles shown in Fig. 1. Of course, a winding energized with direct current may be employed for this purpose. The winding 6 on the rotor 3 is connected across a suitable signal voltage source 7. This may be either a unidirectional voltage source or an alternating voltage source. The output circuit is also connected across the rotor winding 6 and is herein illustrated as comprising a transformer 8 which couples the output circuit with a load. This output circuit is in accordance with my invention tuned by means of condensor 9 substantially to unity power factor so that there will be no reaction torque exerted on the rotor of the device and high power gain may therefore be realized. For limiting purposes, as herein contemplated, the rotor 3 is schematically illustrated as being provided with a vane 10 which is adapted to rotate with rotor 3 and between the adjustable stops 11 and 12. By this arrangement, the device of Fig. 1 may serve to amplify and provide an output proportional to the amplitude of the signal voltage input until the vane 10 arrests further deflection of the rotor by engaging one or the other of stops 11 or 12. Thereafter, with a unidirectional input signal, the output will not increase even though the input signal voltage should increase. However, an A. C. input signal would feed directly into the load circuit should it increase after a limit stop condition is attained unless some means such as a bridge circuit of the character hereinafter described in connection with Figs. 2 and 3 is used. It will be observed that Fig. 1 illustrates a device which may function as an A. C. amplifier, a modulator and also as a limiter, and other signals may be supplied thereto as hereinafter more particularly pointed out so that signal mixing may also be obtained.

The operation of the device shown in Fig. 1 may be more clearly understood from the following brief description of its principles of operation. With an alternating magnetic field produced by the core 1 and exciting winding 4, within which the moving coil or rotor is disposed, and the air gap reluctance being substantially constant, a signal voltage applied to the rotor winding will produce deflection thereof due to interaction between the fixed field and the rotor field. However, deflection of the coil from a position of zero coupling of the alternating field with the moving coil or rotor winding to one in which some coupling exists results in an induced current in the rotor winding which in turn will set up an alternating magnetic field which interacts with the fixed field and thereby causes the rotor to exert a turning force or torque which will produce rotation of the rotor in a direction and to a magnitude that is a function of the time and space phase angle of the interacting fluxes. To eliminate reaction torques on the rotor due to interaction between the flux produced by the induced current and the flux of the alternating field, I tune the load circuit of the device substantially to unity power factor, for example, by means of a condenser 9. Hence, when the rotor is deflected in accordance with the input signal voltage, the flux produced by the induced current in the winding will be in quadrature with the field flux and no reaction torque will result.

It will be observed that the current induced in the rotor winding, due to inductive reactance in the rotor winding circuit, will lag the induced voltage and will produce a component of flux which is 180° out of phase with the alternating field flux. Under such conditions, the torque reaction produced by the interacting fluxes will cause the rotor to rotate in a direction and toward a position in which the least possible field flux is coupled with the rotor winding. However, if the rotor winding circuit is capacitive in nature through the use of sufficient capacity in that circuit, the induced current in the rotor winding will lead the voltage induced therein with the result that the rotor torque tends to rotate the rotor in a direction and toward a position in which maximum possible field flux is coupled with the rotor winding. Hence, with an output circuit of an inductive nature coupled to the rotor winding, the rotor tends to move toward a position in which its axis lies perpendicular to the fixed alternating field. On the other hand, if the output circuit is of a capacitive nature, the rotor tends to rotate toward a position in which its axis parallels the direction of the field.

Hence, in accordance with the present invention, the output circuit connected with the rotor winding of the electromagnetic device constituting one stage of my amplifier is tuned to exhibit unity power factor when the rotor winding is deflected in accordance with an input signal so that, in this position of the rotor, there will be no reaction exerted on the rotor winding. With this arrangement, when unity power factor exists, the output circuit of the rotor winding will appear as one having no reactance and therefore the induced current in the rotor winding will be in phase with the induced voltage and the flux produced by the induced current and the field flux will be in quadrature.

In view of the foregoing, the device of Fig. 1 will produce angular deflection of rotor 3 proportional to the amplitude of the signal voltage applied to the rotor winding. Since, as above described, the output circuit is tuned by means of condenser 9 to exhibit unity power factor when the rotor is so displaced in accordance with the signal voltage, no reaction torque will be exerted on the rotor. Hence, high power gains may be realized and a linear output over an appreciable range may be obtained.

In accordance with the present invention, one or more of the units of the character exemplified by Fig. 1 of the drawings are employed to form an amplifier and in Fig. 2 I have disclosed a representative form of amplifier. Although I have disclosed particular types of signal voltage sources as feeding into the amplifier, it will be understood that a greater or less number of signal sources may be employed and the signals may represent different data from those herein described. Since, the amplifier of the present invention is admirably suited for use in a navigation system for navigable craft such as aircraft, I have illustrated and will hereinafter describe the preferred forms of my invention as embodied in a navigation system for aircraft. However, it is to be understood that my invention is not limited thereto.

Briefly, the navigation system which I have illustrated in connection with the amplifier of my invention utilizes certain data such as signals proportional to displacement of an aircraft from a radio defined path and signals proportional to the heading of the craft relative to the bearing of such defined path together with signals proportional to roll or bank attitude of the craft. The amplifier functions as a computer to compute the dynamic equation of craft motion, employing these signals as instantaneous values of the terms of the equation and providing an output which, in turn, provides an indication to the pilot of the the correct attitude of the craft to satisfy such equation at that instant. Hence, if the instantaneous solution of the equation is satisfied, all terms of the equation will ultimately be reduced to zero, thereby providing the correct navigation information for the craft. Stated in other words, the system herein used for exemplary purposes furnishes information to the pilot whereby he knows exactly how much correction in attitude of the craft should take place in order to cause the craft to approach and thereafter maintain the desired flight path. A navigation system of the foregoing character is fully described in copending application S. N. 128,227 for Control Systems, filed November 18, 1949, in the name of Spencer Kellogg 2nd, and assigned to the assignee of the present invention, said application having matured into U. S. Patent No. 2,613,352, dated October 7, 1952.

Referring now to Fig. 2, I have shown three primary data sources which supply signals which are supplied to the amplifier which in turn functions to compute the dynamic equation of craft motion using the various signals as terms in said equation. For example, 13 represents a radio receiver which may be of the type ordinarily employed in radio navigation and may embody an ILS (Instrument Landing System) receiver for the localizer beam, that is, the beam which determines the flight path in azimuth. A complete system would, of course, also embody a receiver for the glide path beam of an instrument landing system, as is more particularly brought out in connection with Fig. 3 for use in controlling the pitch attitude of the craft. The signal output of the radio receiver is supplied to the first stage indicated generally at 14 of my amplifier. Stage 14 comprises a device of the character illustrated in Fig. 1, the field winding being indicated at 15 and the moving coil or rotor winding at 16. The core is illustrated in the conventional schematic manner and since the signal voltage derived from the radio receiver is of a unidirectional character the core will either carry a polarizing winding or else be provided with permanent magnet poles as indicated in Fig. 1. Further, in accordance with my invention, stage 14 is provided with limit stops indicated schematically at 17 with which a vane cooperates to limit the angular deflection of the moving coil 16. The output of radio receiver 13 is connected by leads 18 and 19 to coil 16 while field winding 15 is energized from a suitable source of alternating current 20 preferably through a phase adjusting means such as the variable impedance and capacitance indicated generally at 21. The output circuit of this stage comprises the leads 22 and 23 which are connected to opposite ends of the moving coil 16 and across the primary 241 of a coupling transformer 24. In accordance with my invention, this output circuit is tuned by means of condenser 25 substantially to unity power factor.

A second signal is supplied to the amplifier in the navigating system exemplifying the present invention and, for illustration purposes, I have shown such a signal as derived from a slaved directional gyroscope 27. The pick-off of this gyroscope is energized from source 20 through a suitable phase shifting impedance-reactance network indicated generally at 221 and the signal output which is proportional to the angular deviation of the craft with respect to a reference heading provided by the gyroscope is supplied to a heading selector 28. This heading selector may be manually adjusted so that its signal output is proportional to the angular deviation of the craft from some selected heading. This second signal is supplied to the amplifier by leads 29 and 30 and mixed with the radio signal in the output circuit of the first stage of the amplifier. The heading signal may be applied across an impedance element 31 which is connected in series with the output circuit of the first stage. Since the output of the first stage is an alternating signal voltage and since the heading signal derived from the heading selector is also an alternating signal voltage, these voltages may be algebraically combined.

The secondary 242 of coupling transformer 24 serves to supply the radio error signal and the heading signal to the second stage of the amplifier. This stage is indicated generally at 141 and may be similar in all major respects to the first stage and may be constructed in the form of the device shown in Fig. 1. Since the signals supplied to stage 141 are alternating in character, no unidirectional field need be supplied. However, a unidirectional field may be supplied for damping, or, a damping vane may be used for this purpose. As described in connection with the first stage, the field winding 151 of stage 141 is energized from source 20 through a suitable phase shifting network 121; limit stops are provided as indicated at 171, and the moving coil 161 is connected through impedance 26 across secondary 242 of coupling transformer 24. Hence, a signal proportional to the algebraic sum of the radio error and the heading signals is supplied to the moving coil 161 of stage 141. The output of this stage is supplied to an output circuit comprising leads 32 and 33. This output circuit serves to combine the output of stage 141 with a third signal derived from a gyro vertical indicated generally at 34. The gyro vertical is provided with a pick-off energized from source 20 through a phase adjusting circuit 35 and provides a signal voltage output proportional to the bank angle of the craft. This signal is supplied by leads 36 and 37 in series in the output circuit of stage 141. Still another signal is mixed in the output circuit of stage 141. This signal is derived from transformer 38, the primary 39 of which is energized from source 20 through a suitable phase shifting circuit 40 and the secondary 41 of this transformer is connected across an adjustable impedance 42. Lead 33 is connected to the slider of impedance 42 while the center tap of secondary 41 is connected through lead 43 to the moving coil 44 of an A. C. meter 45. The other end of the meter coil is connected through lead 46 to lead 37. The field coil 47 of meter 45 is also energized from source 20 and the phase of the exciting current may be adjusted by the variable impedance-reactance network 48.

The signal derived from transformer 38 may be referred to as a roll trim signal source, the voltage output therefrom being adjustable by the pilot to provide small corrections in adjusting the system to an existing out-of-level attitude of the craft in roll. Condenser 49 is connected across the moving coil of meter 45 for the purpose of tuning the output circuit of the second stage of the amplifier substantially to unity power factor. The needle 50 of the meter is deflected in accordance with the output of the amplifier to indicate to the pilot with reference to a lubber line whether or not and to what degree the craft attitude in roll should be adjusted in order for the craft to follow the navigation pattern or path computed by the amplifier.

The operation of the amplifier of Fig. 2 is as follows. The radio error signal derived from the radio receiver is amplified in the first stage 14 of the amplifier and the limit stops 17 prevent the amplified signal from exceeding some predetermined value. The output circuit of the first stage 14 serves to mix the radio error signal with a heading signal so that a signal proportional to the difference therebetween is supplied as the input signal to the second stage 141 of the amplifier. Since the output circuit is tuned to unity power factor there will be no reaction torque exerted by the moving coil 16 of the first stage and hence high power gain coupled with linear amplification will result. The difference signal is amplified in the second stage 141 of the amplifier, the amplified signal being limited by means of limit stops 171 to prevent it exceeding some predetermined value. The amplified signal derived from stage 141 is algebraically combined with a signal from the gyro vertical in the output circuit of the second stage. The gyro vertical signal is proportional to the bank angle of the craft and this signal, in being mixed in the output of stage 141, is compared with the signal output of this stage and the difference is supplied to actuate meter 45. The roll trim signal derived from transformer 38 is also combined in the proper phase relation to correct for out-of-trim conditions as above pointed out. It will be noted that the output circuit of stage 141 is connected to one end of moving coil 161 and to a center tap on the secondary 242 of coupling transformer 24. The impedance 26, moving coil 161 and secondary 242 of transformer 24 form a bridge-like circuit across which the output circuit is connected. With this arrangement, the input to stage 141 which is of an alternating character will be isolated from the output circuit and hence the input signal cannot feed directly into the output circuit and produce deflection of the meter needle after, for example, the motion of the moving coil of stage 141 has been arrested by the limit stops.

Further, in accordance with my invention, I prevent any deflection of the moving coil of a stage of the amplifier in response to some signal which is added to its output. If such were to occur, a change in sensitivity of that stage would result if in a limit stop condition. To this end, I have provided suitable phase shifting circuits or networks both in connection with the sources of signal voltage and the sources of exciting current for the various field windings of the amplifier and these are adjusted so that the relative phase of the various signals with respect to each other and with respect to the phase of the exciting currents in the field windings of the stages is such that the vector sum of these currents in the output circuit of any stage will produce in the moving coil of that stage a flux which is in quadrature with the field flux and hence no deflection will result due to any signals supplied to and combined with the signal outputs in the output circuits of the amplifier.

In Fig. 2 I have illustrated one embodiment of my invention as embodied in the azimuth channel of a navigation system. As hereinbefore indicated, such a system will also involve a second or pitch channel which provides indications of the correct attitude of the craft in pitch. Fig. 3 illustrates an embodiment of my invention which provides signal mixing, amplification, limiting and the like for both channels of a navigation system and in Fig. 3 I have shown a single field structure for the moving coils of all of the stages of both amplifiers. In Fig. 3, 51 indicates a generally rectangular frame-like core provided with spaced air gaps 52, 53, 54 and 55 within which the rotors or moving coils of the various stages are respectively disposed. A field winding 56 is connected with a suitable source of alternating current 57 and provides alternating fields within the respective air gaps. For modulation purposes, I have shown a permanent magnet 58 disposed across the core 51 substantially midway between opposite sides thereof. Limit stops indicated generally at 59 may be provided for each of the stages. The first stage of the azimuth channel, which azimuth channel is similar to that hereinabove discussed in connection with Fig. 2, comprises the moving coil 60 and the moving coil of the second stage is indicated at 61. The signal derived from the radio receiver 13 which provides a signal proportional to displacement of the craft from the localizer beam is connected through leads 62 and 63 to coil 60. The output circuit includes the primary 64 of a coupling transformer 65 and a condenser 66 which tunes the output circuit substantially to unity power factor. The resulting modulated signal is coupled by transformer 65 to the second stage of the azimuth amplifier, the secondary 67 of transformer 65 being connected with the moving coil 61. The heading signal derived from a slaved directional gyroscope 27 and heading selector 28 is supplied to the moving coil 61 and mixed with the radio error signal. The pick-off from the directional gyro is connected with source 57 and may be phase adjusted by the network 68. The output circuit of the second stage of the azimuth amplifier, which embodies moving coil 61, includes leads 69 and 70. Lead 69 is connected to the midtap on the secondary 67 of transformer 65 and in series with an impedance 71 to one coil 72 of a cross pointer meter 73. Coil 72 drives the vertical needle of the cross pointer meter.

Lead 70 connects tuning condenser 74 in circuit with a source of roll trim signal indicated as the variable impedance 75 which is connected through leads 76 and 77 across center tapped winding 78 mounted on the core 51. These windings supply an alternating voltage across the impedance 75, the amplitude of which is regulated by the position of the slider on impedance 75. The circuit is completed by lead 79 which connects between the midtap on winding 78 and one side of the coil 72 of the cross pointer meter 73. Due to the bridge arrangement, an adjustment of the slider from the midposition in one direction or the other will provide a trim voltage of desired magnitude and phase sense.

The output of the second stage of the amplifier is compared with a signal voltage proportional to bank angle of the craft which is derived from the roll pick-off of the gyro vertical 34. This pick-off is excited from the alternating current source 57 which feeds through a suitable phase adjusting network 80.

The operation of the azimuth channel of the amplifier shown in Fig. 3 and above described is in all material respects similar to that described in connection with the amplifier of Fig. 2.

The pitch channel of the amplifier of Fig. 3 comprises an amplifying and modulating stage which includes the moving coil 81 mounted to rotate in the air gap 55. A glide slope receiver 131 which provides a signal voltage proportional to vertical displacement of the craft from a radio defined glide slope is connected through leads 82 and 83 to supply its voltage output across coil 81. The output circuit of the pitch channel includes leads 87 and 88 which connect the moving coil 81 through tuning condenser 89 to the primary 90 of coupling transformer 91. The output circuit is tuned substantially to unity power factor, and the secondary winding 92 of coupling transformer 91 is connected through lead 93 to the slider of a variable impedance such as potentiometer 94. This potentiometer like potentiometer 75 is connected across leads 76 and 77 so that voltages are supplied thereto from the center tapped winding 78. The slider of potentiometer 94 is adjustable by the pilot to provide a pitch trim signal whereby to correct for various pitch attitudes of the craft. The secondary 92 of coupling transformer 91 is also connected through lead 95 to an impedance such as resistor 96 across which a signal proportional to the pitch angle of the air craft is supplied from a pick-off on the pitch axis of the gyro vertical 34. The gyro vertical is shown as separate units in the azimuth and pitch channels of the amplifier, but it will be understood that the same gyro is ordinarily used. The pick-off on the pitch axis of gyro 34 is energized from alternating current source 57 through a suitable phase shifting network 97. Resistor 96 is connected through lead 98 to coil 99 which operates the horizontal needle of cross pointer meter 73, the other end of coil 99 being connected with lead 79 hereinabove described.

The remaining air gap 54 has a rotor mounted therein in order to provide paths of substantially equal reluctance in the azimuth and pitch halves of core 51.

In the above described pitch channel of the amplifier of Fig. 3, the glide slope error signal which is of a unidirectional character and the glide slope trim signal is supplied to moving coil 81 of the pitch amplifier. The stage of the amplifier serves to modulate the glide slope signal and also to limit its output by means of limit stops 59. The output signal, which is proportional to the glide slope error signal and glide slope trim signals is compared with the pitch signal from the gyro vertical in the output circuit and a signal proportional to the algebraic difference between the output signal and the pitch signal is supplied to actuate the horizontal needle of the cross pointer meter 73. The various signal currents in the output circuit of this amplifier are also preferably so phased with respect to each other and the field currents producing the alternating field of the amplifier that the vector sum thereof will produce a flux in quadrature with the field flux and hence cause no deflection of moving coil 81.

It will be understood, although not herein illustrated, that an altimeter may be connected as a voltage source to the pitch channel of the amplifier. However, the altimeter signal will only be employed when the glide slope signal is cut out and the altitude signal will be removed when the system is operating on the glide slope signal. Since these results may be obtained simply by employing switches to connect in the desired signal sources and provide the desired combinations of signals under the different navigating procedures, these have not been illustrated.

It will be noted that the amplifiers herein illustrated and described are rugged in construction and may be made of small size and low weight. Moreover, they serve to modulate, limit, mix and amplify signals with extremely high power gain. All this is accomplished with good linearity due to the lack of reaction torques in the various stages of the amplifier. Hence, a navigating system of high fidelity results because of the desirable attributes of the amplifier herein illustrated and described.

While I have described my invention in its preferred embodiments, it is to be understood that the words which I have used are words of description rather than of limitation and that changes within the purview of the appended claims may be made without departing from the true scope and spirit of my invention in its broader aspects.

What is claimed is:

1. A mixer amplifier comprising a plurality of stages, each including a stator and winding thereon connected to an alternating exciting current source and providing a fixed alternating magnetic field and a rotor and winding thereon rotatably mounted in said field, a signal voltage source connected with the rotor winding of a first stage of said amplifier, an output circuit connected with the rotor winding of said first stage including means for tuning said output circuit to unitary power factor, a second stage having its rotor winding coupled to receive the output of said first stage, and a second output circuit connected with the rotor winding of said second stage and including means for tuning said second output circuit to unitary power factor.

2. A mixer amplifier comprising a plurality of stages, each including a startor and winding thereon connected to an alternating exciting current source and providing a fixed alternating magnetic field and a rotor and winding thereon rotatably mounted in said field, a signal voltage source connected with the rotor winding of a first stage of said amplifier, an output circuit connected with the rotor winding of said first stage including means for tuning said output circuit to unity power factor, a second stage having its rotor winding coupled to receive the output of said first stage, a second output circuit connected with the rotor winding of said second stage and including means for tuning said second output circuit to unity power factor, and means for adjusting the relative phase of the currents supplied to the output circuit of said first stage other than the signal current output of said first stage so that the vector resultant thereof in the rotor winding of said first stage will produce a flux in quadrature with the field flux thereby producing no deflection of said rotor due to such currents.

3. A mixer amplifier comprising a plurality of stages each including a stator and winding thereon connected with an alternating exciting current source to provide a fixed alternating magnetic field and a rotor and winding thereon rotatably mounted in said field, means providing a unidirectional field about the rotor and winding of a first stage, a unidirectional signal voltage source connected with the rotor winding of said first stage of the amplifier, an output circuit connected with the rotor winding of said first stage including means for tuning said output circuit to unity power factor, a second stage having its rotor winding coupled to receive the output of said first stage, and a second output circuit connected with the rotor winding of said second stage and including means for tuning said second output circuit to unity power factor.

4. A mixer amplifier comprising a plurality of stages, each including a stator and winding thereon connected to an alternating exciting current source and providing a fixed alternating magnetic field and a rotor and winding thereon rotatably mounted in said field, a signal voltage source connected with the rotor winding of a first stage of said amplifier, an output circuit connected with the rotor winding of said first stage including means for tuning said output circuit to unity power factor, a second signal voltage source coupled to said output circuit, a second stage having its rotor winding coupled to receive energy from the output circuit of said first stage, and a second output circuit connected with the rotor winding of said second stage and including means for tuning said second output circuit to unity power factor.

5. An amplifier of the character recited in claim 4, further including means for adjusting the relative phase of the currents supplied to the output circuit of a stage other than the signal current output of said stage so that the vector resultant thereof in the rotor winding of that stage will produce a flux in quadrature with the field flux thereby producing no deflection of that rotor due to such currents.

6. An amplifier comprising a stator structure and winding thereon connected to an alternating exciting current source and providing a fixed alternating magnetic field and a rotor and winding thereon rotatably mounted in said field, a signal voltage source connected with said rotor winding, an output circuit connected with said rotor winding including means for tuning said output circuit to unity power factor, a second signal voltage source coupled to said output circuit, and means for adjusting the relative phase of the currents supplied to said output circuit other than the signal current output of said stage so that the vector resultant thereof in the rotor winding will produce a flux in quadrature with the field flux thereby producing no deflection of the rotor due to such currents.

7. A mixer amplifier comprising a plurality of stages, each including a stator and winding thereon connected to an alternating exciting current source and providing a fixed alternating magnetic field and a rotor and winding thereon rotatably mounted in said field, means providing a unidirectional field about the rotor and winding of a first stage, a unidirectional signal voltage source coupled with the rotor winding of said first stage of the amplifier, an output circuit connected with the rotor winding of said first stage including means for tuning said output circuit to unity power factor, an alternating signal voltage source coupled with said output circuit, a second stage having its rotor winding coupled to receive energy from said output circuit, and a second output circuit connected with the rotor winding of said second stage including means for tuning said second output circuit to unity power factor.

8. An amplifier of the character recited in claim 7, further including means for adjusting the relative phase of the currents supplied to the output circuit of a stage other than the signal current output of said stage so that the vector resultant thereof in the rotor winding of that stage will produce a flux in quadrature with the field flux thereby producing no deflection of that rotor due to such currents.

9. A mixer amplifier comprising a plurality of stages, each including a stator and winding thereon connected to an alternating exciting current source and providing a fixed alternating magnetic field and a rotor and winding thereon rotatably mounted in said field, a signal voltage source connected with the rotor winding of a first stage of said amplifier, an output circuit connected with the rotor winding of said first stage including means for tuning said output circuit to unity power factor, a second signal voltage source coupled with said output circuit, a second stage having its rotor winding coupled to receive the output of the first stage, a second output circuit connected with the rotor winding of said second stage, a third signal voltage source coupled with said second output circuit, and means in said second output circuit for tuning it to unity power factor.

10. An amplifier of the character recited in claim 9, further including means for adjusting the relative phase of the currents supplied to the output circuit of a stage other than the signal current output of said stage so that the vector resultant thereof in the rotor winding of that stage will produce a flux in quadrature with the field flux thereby producing no deflection of that rotor due to such currents.

11. An amplifier comprising a plurality of stages, each including a stator and winding thereon connected to an alternating exciting current source and providing a fixed alternating magnetic field and a rotor and winding thereon rotatably mounted in said field, a signal input circuit including a signal voltage source connected with the rotor winding, said input circuit including impedances forming a balanced bridge-like circuit, and an output circuit connected across points of said input circuit such that substantially no signal voltage from said source will be coupled directly to said output circuit while the current induced in said rotor winding will be supplied to said output circuit.

12. An amplifier comprising a stator structure and winding thereon connected to an alternating exciting current source and providing a fixed alternating magnetic field and a rotor and winding thereon rotatably mounted in said field, a signal voltage source connected with said rotor winding, an output circuit connected with said rotor winding including means for tuning said output circuit to unity power factor, a second signal voltage source coupled to said output circuit, means for adjusting the relative phase of the currents supplied to said output circuit other than the signal current output of said stage so that the vector resultant thereof in the rotor winding will produce a flux in quadrature with the field flux thereby producing no deflection of the rotor due to such currents, and means for tuning said output circuit to unity power factor.

13. A mixer amplifier comprising a plurality of stages, each including a stator and winding thereon connected to an alternating exciting current source and providing a fixed alternating magnetic field and a rotor and winding thereon rotatably mounted in said field, a signal voltage source connected with the rotor winding of a first stage of said amplifier, an output circuit connected with the rotor winding of said first stage including means for tuning said output circuit to unity power factor, a second signal voltage source coupled with the output circuit of said first stage, a second stage having its rotor winding coupled to receive the output of said first stage, a second output circuit connected with the rotor winding of said second stage, a third signal voltage source connected in said second output circuit, the circuit of the rotor winding of said second stage including impedances forming a balanced bridge-like circuit and said second output circuit being connected across points of said rotor winding circuit such that substantially no signal voltage from the output circuit of said first stage will be supplied to said second output circuit while the current induced in the rotor winding of said second stage will be supplied to said second output circuit, and means included in said second output circuit for tuning said circuit to unity power factor.

14. A mixer amplifier comprising a plurality of stages, each including a stator and winding thereon connected to an alternating exciting current source and providing a fixed alternating magnetic field and a rotor and winding thereon rotatably mounted in said field, a signal voltage source connected with the rotor winding of a first stage, means for limiting the maximum deflection of said rotor, an output circuit connected with the rotor winding of said first stage including means for tuning said output circuit to unity power factor, a second stage having its rotor winding coupled to receive the output of said first stage, a second signal voltage source coupled with the output circuit of said first stage, means for limiting the maximum deflection of the rotor of said second stage, and a second output circuit connected with the rotor winding of said second stage and including means for tuning said second output circuit to unity power factor.

15. A mixer amplifier comprising a plurality of stages, each including a stator and winding thereon connected to an alternating exciting current source and providing a fixed alternating magnetic field and a rotor and winding thereon rotatably mounted in said field, a signal voltage source connected with the rotor winding of a first stage of said amplifier, an output circuit connected with the rotor winding of said first stage including capacitance means for tuning said output circuit to unity power factor, a second stage, a transformer for coupling the output circuit of said first stage with the rotor winding of said second stage, a second output circuit connected with the rotor winding of said second stage and capacitance means in said second output circuit for tuning said circuit to unity power factor.

16. A mixer amplifier comprising a magnetic circuit including a core having spaced air gaps therein and a rotor and winding thereon rotatably mounted in each of said air gaps, a stator winding mounted on said core and connected with an alternating exciting current source, a first signal voltage source connected with the rotor winding of a first of said rotors, an output circuit connected with said rotor, means for tuning said output circuit to unity power factor, means for coupling said output circuit with the winding of a second of said rotors, a second output circuit connected with the winding of said second rotor, and means for tuning said second output circuit to unity power factor.

17. A mixer amplifier of the character recited in claim 16 further including means for supplying a unidirectional magnetic field across the air gaps of said core and in which one of said signal voltage sources supplies a unidirectional signal voltage.

18. A mixer amplifier comprising a magnetic circuit including a core having spaced air gaps therein and a rotor and winding thereon rotatably mounted in each of said air gaps, a stator winding mounted on said core and connected with an alternating exciting current source, a first signal voltage source connected with the rotor winding of a first of said rotors, an output circuit connected with said rotor, means for tuning said output circuit to unity power factor, means for coupling said output circuit with the winding of a second of said rotors, a second output circuit connected with the winding of said second rotor, a second signal voltage source coupled with said second output circuit, and means for tuning said second output circuit to unity power factor.

NORMAN A. HASSLER.

No references cited.